E. SMITH.
RIVETING MACHINE.
APPLICATION FILED MAR. 22, 1911.

1,027,289.

Patented May 21, 1912.

2 SHEETS—SHEET 1.

Witnesses
J. L. Wright.
V. B. Hillyard.

Inventor
Edwin Smith

By Victor J. Evans,
Attorney

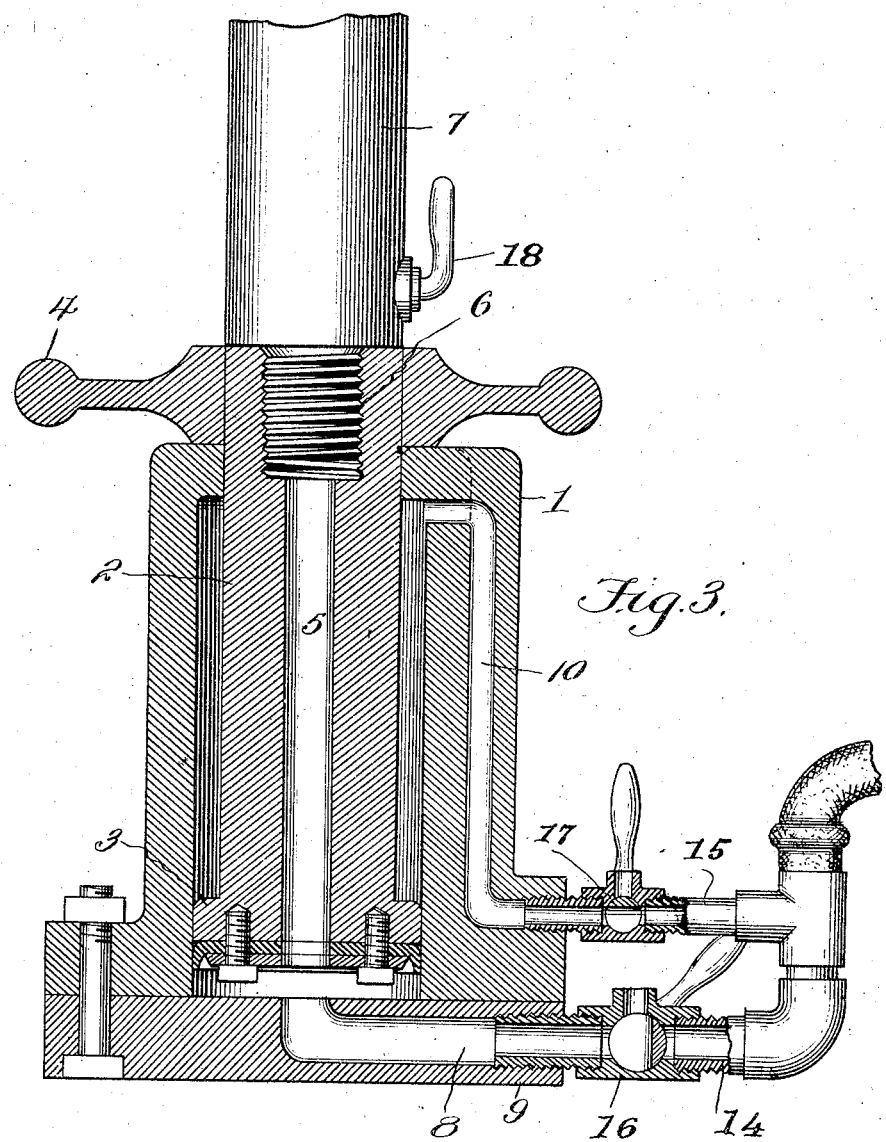

UNITED STATES PATENT OFFICE.

EDWIN SMITH, OF VIAU VILLE, MONTREAL, QUEBEC, CANADA.

RIVETING-MACHINE.

1,027,289.      Specification of Letters Patent.      Patented May 21, 1912.

Application filed March 22, 1911. Serial No. 616,134.

*To all whom it may concern:*

Be it known that I, EDWIN SMITH, a citizen of the United States, residing at Viau Ville, Montreal, in the Province of Quebec and Dominion of Canada, have invented new and useful Improvements in Riveting-Machines, of which the following is a specification.

In boiler factories and in the construction of work requiring the parts to be connected by rivets or stay bolts the upsetting of the ends of the rivets, bolts or like parts has usually been accomplished by hand and is both laborious and costly. Pneumatic machines have been employed for accomplishing such work, but the jar resulting to the workman from the vibration has precluded their universal adoption or use to any very great extent. It is desirable to employ the pneumatic machine because of the rapidity with which the work is performed and at less labor to the workman, but as stated these advantages are offset by the injury resulting from the excessive vibration which jars the operator and produces injurious results.

The present invention provides means for absorbing the jar and shock incident to the vibration of a pneumatic tool when in operation so as to prevent injurious results to the workman and enabling the pneumatic tool to be successfully used in work requiring riveting or the upsetting of stay bolts or like fastening means.

In accordance with this invention the pneumatic tool has a yieldable mount, the latter preferably consisting of a pneumatic support embodying a cylinder and a piston, the latter arranged to operate within the cylinder and having a passage for the compressed air or other fluid medium by means of which the tool is operated.

The invention consists of the novel features, details of construction and combination of parts, which hereinafter will be more particularly set forth, illustrated in the accompanying drawings, and pointed out in the appended claim.

Figure 1:
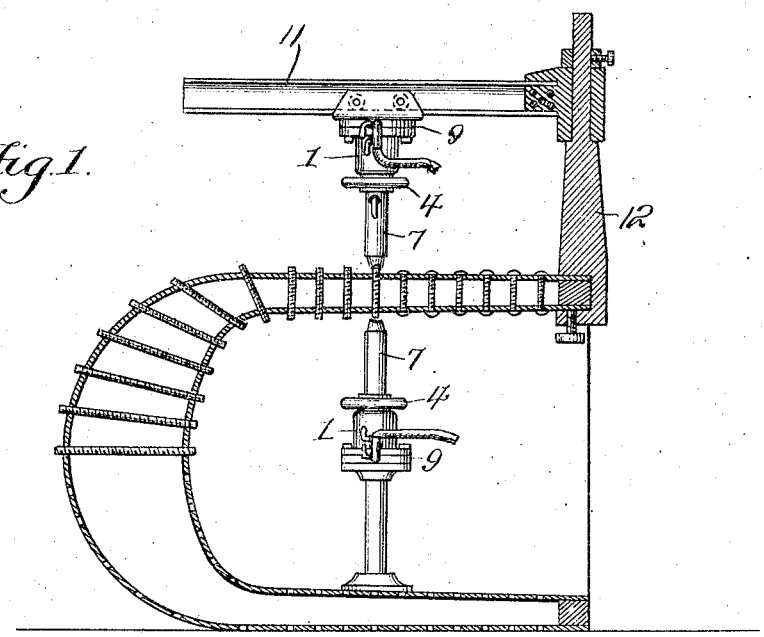
Figure 2:
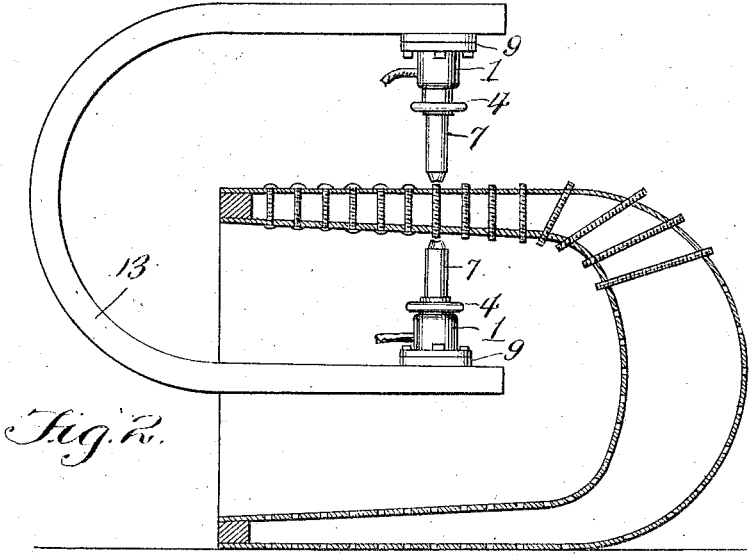

Referring to the drawings, forming a part of the specification, Figure 1 is a detail view, showing one manner of use of the invention. Fig. 2 shows a different application. Fig. 3 is a central longitudinal section of the yieldable or pneumatic mount for the tool.

Corresponding and like parts are referred to in the following description, and indicated in all the views of the drawings, by the same reference characters.

The yieldable or pneumatic mount comprises a cylinder 1 and a piston 2 arranged to operate therein. A head 3 is provided at the inner end of the piston and is of such construction as to insure a close fit with the walls of the cylinder 1. The body of the piston 2 is stout and nearly of a diameter corresponding with the bore of the cylinder so as to withstand the strain to which it is subjected when in operation. The piston operates through an end of the cylinder 1 and the projecting end has a hand wheel 4 or like part secured thereto whereby the piston may be turned when the tool is in operation. An opening 5 extends through the piston and piston head to admit of the passage of compressed air or other motive medium to the tool which is attached directly to the piston. The outer end of the opening 5 is enlarged, as indicated at 6, the enlarged portion of the opening being internally threaded to make screwthread connection with the pneumatic tool 7, which is attached to the piston and carried thereby. An opening 8 is formed in the base 9 of the cylinder, said opening having connection with the source of supply of compressed air or like medium. A passage 10 is in communication with the outer end of the cylinder and also connects with the source of supply of compressed air or motive medium. It is to be understood that the pipes 14 and 15 connecting the parts 8 and 10 with the source of supply of motive medium are provided with two-way valves 16 and 17 to admit of directing the motive medium into either end of the cylinder according to the required direction of movement of the piston. When the motive medium is admitted into the cylinder through the opening 8 the piston is forced outward, thereby bringing the pneumatic tool 7 into engagement with the work. When the motive medium is admitted into the cylinder through the passage 10 the piston is forced inward, thereby carrying the pneumatic tool away from the work.

Figs. 1 and 2 of the drawings show two pneumatic tools located upon opposite sides of the work so as to rivet opposite ends of the same stay bolt at one operation. In Fig. 1 the lower tool is supported upon the bed of the combustion chamber of a boiler, whereas the upper tool is attached to an arm 11 secured to an upright 12 clamped to the crown or upper portion of the boiler. In Fig. 2 a frame 13 of substantially U form is provided, said frame being arranged with its members extending upon opposite sides of the work and each supporting a pneumatic tool and the mount therefor.

In operation the pneumatic tool 7 of any type, make or variety is secured to the piston of the mount and after the parts have been properly positioned the valve 16 admitting compressed air to the opening 8 is opened and the compressed air entering the cylinder forces the piston 2 upwardly or outwardly within the cylinder and brings the pneumatic tool in contact with the work, after which the valve 18 admitting the compressed air to the tool is opened and the rivet or like fastening is upset. The compressed air it will be observed passes through the cylinder and piston to the pneumatic tool. After the rivet or fastening has been upset the valve 16 controlling the supply to the opening 8 is closed and the valve 17 admitting compressed air to the passage 10 is opened, thereby forcing the piston inward and carrying the pneumatic tool away from the work so that the parts may be adjusted to the next fastening.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A pneumatic mount for a pneumatic riveting tool, the same comprising a cylinder having a passage formed in a side in communication with one end of the cylinder and having valved connection with the source of air supply, a head closing the opposite end of the cylinder and having a passage formed therein which has valved connection with the source of air supply, a piston arranged to operate in the cylinder and having an end portion projecting beyond an end of the cylinder, said piston having its inner end enlarged to form a head and further provided with an opening extending therethrough, the outer end of the opening being enlarged to admit of connection of a pneumatic tool with the projecting end of the piston, and a hand piece fitted to the projecting end of the piston.

In testimony whereof I affix my signature in presence of two witnesses.

EDWIN SMITH.

Witnesses:
 CHARLES ISAACS,
 CHAS. F. DICKERSON.